(12) United States Patent
Finn et al.

(10) Patent No.: US 7,580,875 B1
(45) Date of Patent: Aug. 25, 2009

(54) INVESTMENT SYSTEM AND METHOD

(76) Inventors: Gregory McCabe Finn, 214 Eton Rd., Pittsburgh, PA (US) 15205; Bruce Gordon Bernstein, 104 Woodside Rd., Apartment B105, Haverford, PA (US) 19041

( * ) Notice: Subject to any disclaimer, the term of this patent is extended or adjusted under 35 U.S.C. 154(b) by 0 days.

(21) Appl. No.: 09/547,409

(22) Filed: Apr. 12, 2000

Related U.S. Application Data

(60) Provisional application No. 60/129,321, filed on Apr. 14, 1999.

(51) Int. Cl.
*G06Q 40/00* (2006.01)

(52) U.S. Cl. .............................. 705/36; 705/38; 705/37; 705/35

(58) Field of Classification Search ............. 705/35–38, 705/43
See application file for complete search history.

(56) References Cited

U.S. PATENT DOCUMENTS

| | | | |
|---|---|---|---|
| 3,573,747 A | | 4/1971 | Adams et al. |
| 5,101,353 A | * | 3/1992 | Lupien et al. ................. 705/37 |
| 5,126,936 A | | 6/1992 | Champion et al. |
| 5,758,097 A | | 5/1998 | Debe et al. |
| 5,784,696 A | | 7/1998 | Melnikoff |
| 5,794,219 A | | 8/1998 | Brown |
| 5,799,287 A | | 8/1998 | Dembo |
| 5,806,047 A | | 9/1998 | Hackel et al. |
| 5,806,049 A | | 9/1998 | Petruzzi |
| 5,812,987 A | | 9/1998 | Luskin et al. |
| 5,819,238 A | * | 10/1998 | Fernholz ....................... 705/36 |
| 5,852,811 A | | 12/1998 | Atkins |
| 5,884,285 A | * | 3/1999 | Atkins ......................... 705/36 |
| 5,911,135 A | | 6/1999 | Atkins |
| 5,911,136 A | | 6/1999 | Atkins |
| 5,918,218 A | | 6/1999 | Harris et al. |
| 5,930,774 A | | 7/1999 | Chennault |
| 5,946,666 A | | 8/1999 | Nevo et al. |
| 5,987,435 A | | 11/1999 | Weiss et al. |
| 6,029,148 A | | 2/2000 | Zurstrassen |
| 6,064,985 A | * | 5/2000 | Anderson ..................... 705/36 |
| 6,161,098 A | * | 12/2000 | Wallman .................. 705/36 T |
| 6,505,174 B1 | * | 1/2003 | Keiser et al. .................. 705/37 |
| 6,601,044 B1 | * | 7/2003 | Wallman ..................... 705/36 |
| 6,996,539 B1 | * | 2/2006 | Wallman .................. 705/36 T |

FOREIGN PATENT DOCUMENTS

WO     WO 99/46658     9/1999

OTHER PUBLICATIONS

View Point: Question Nasdaq, Margaret Dibben, The Observer, London (UK) Nov. 14, 1999 p. 9.*

(Continued)

*Primary Examiner*—Frantzy Poinvil
*Assistant Examiner*—Clement Graham

(57) ABSTRACT

An investment system comprising at least one investor, at least one financial market, and an investment vehicle. The investment vehicle enables the at least one investor to selectively buy and sell interests in each of a plurality of different individual securities traded on the at least one financial market. For each of the plurality of individual securities, interests in the security which are bought or sold by the at least one investor can correspond to a selected fractionalized market unit of the security.

20 Claims, 7 Drawing Sheets

OTHER PUBLICATIONS

MMS Securities, Inc., NAIC Stock Service new member package, including Forms 1-13, Investment Club Signature Page, Stock Service Details, and Terms & Conditions (date unknown).

K. Gerencher. "Online Investing Meets Dollar Cost Averaging. Sharebuilder.com Offers 'Antidote' to Market Timing," http://cbs.marketwatch.com/archive/20000308/news/current/invest.htx?sourc.../yhoo&dist=yho (last updated: 3:22 PM ET Mar. 8, 2000).

A. Tobias, "The High Cost of Mutual Funds...And What You Can Do About It," http://www.personalfund.com/learnmore.html (copyright 1999).

A. Tobias, "A New Fund for a New Meillenium," Mutual Funds, p. 110 (Feb. 2000).

MMS Securities, Inc., NAIC Stock Service, http://naicstockservice.com/start/shtml (copyright 1998).

FOLIOfn—Online Folio Investing, http://www.foliofn.com and associated web pages (copyright 2000).

"The Difference Between Folios and Mutual Funds," http://www.foliofn.com/content/forum/all_about/article_000424.html (Mar. 30, 2000).

* cited by examiner

| Company A ($120/share) | Company B ($85/share) | Company C ($50/share) |
|---|---|---|
| Buy      $118.00 | Buy      $75.00 | Buy      $45.00 |
| Sell     8 shares | Buy      $800.00 | Buy      $32.00 |
| Buy      $12.50 | Sell     6.8 shares | Buy      $67.60 |
| Buy      $81.30 | Buy      $55.00 | Buy      $55.40 |
| Buy      $73.10 | Sell     2 shares | Sell     3 shares |
| Sell     6.41 shares | Buy      $33.00 | Sell     1 share |
| *Buy tally:* $284.90 | *Buy tally:* $963.00 | *Buy tally:* $200.00 |
| *Sell tally:* 14.41 shares | *Sell tally:* 8.8 shares | *Sell tally:* 4 shares |

Fig. 6

INVESTMENT SYSTEM AND METHOD

CROSS-REFERENCE TO RELATED APPLICATIONS

The present application claims priority to provisional application No. 60/129,321, filed on Apr. 14, 1999, and entitled "Investment System and Method," the contents of which are hereby incorporated by reference into the present application.

BACKGROUND OF THE INVENTION

The present invention relates to investment systems and methods, and more particularly, to an improved investment system and method that enable investors to buy, sell, and hold interests in securities (e.g., stocks, bonds, etc.) in a flexible, organized, and cost efficient manner.

Every investor has unique needs. Some investors may have short-term investment horizons, while others may have medium-term or long-term investment horizons. Some investors may seek liquidity, while others may seek appreciation. Some investors can tolerate high risk, while others cannot. In any event, the ultimate goal of any investor is to develop a portfolio of investments that provides the highest potential return in light of the investor's individual investment goals, time horizon, risk tolerance, and cash flow needs.

When planning an investment strategy, it is generally advised that one considers having a diversified portfolio. For instance, participation in a variety of equity investment styles, such as growth and income approaches, and investments in a combination of large, medium, and small capitalization stocks, can potentially provide more balanced results over time. In general, the more diversified a portfolio, the less likely it is that an investor will be harmed by poor performance by any single investment.

One investment tool used by many investors is systematic investing, or so-called dollar-cost averaging. Dollar-cost averaging is the practice of investing equal amounts of money at regular intervals regardless of whether the markets are moving up or down. This technique may reduce the average investment costs to the investor, who acquires more investments in the periods of lower prices and fewer investments in the periods of higher prices. Dollar-cost averaging works best if the investor invests on a regular schedule, regardless of price fluctuations. One advantage of dollar-cost averaging is that it increases the likelihood that an investor will follow an investment program.

There are currently several investment vehicles available to investors for buying, selling, and holding securities. The term "investment vehicle" is intended to mean any entity or any combination of coordinated entities that enable investors to buy, sell, and/or hold investments. As will be explained below, currently available investment vehicles have one or more disadvantages.

One way investors can buy, sell, and hold securities is through a traditional brokerage account offered by a brokerage firm. By opening up a brokerage account, an investor can buy, sell, and trade securities through one or more third parties, i.e., brokers, on one or more of the appropriate public financial markets. One drawback to buying and selling securities in this manner is that the investor cannot buy fractionalized market units of the securities. The term "market unit" is intended to mean the smallest unit of a security available for purchase or sale on a public financial market. For example, in the case of a stock, the market unit is one share. The term "fractionalized market unit" is intended to mean a fraction of a security's market unit or a positive whole number multiple (i.e., 1×, 2×, 3×, etc.) plus a fraction of the security's market unit. For example, again in the case of a stock, a fractionalized market unit is either a fraction of a share (e.g., 0.3 shares, 0.8 shares, etc.) or a positive whole number multiple plus a fraction of a share (e.g., 1.3 shares, 2.8 shares, etc.).

Not being able to buy fractionalized market units of a security can be particularly problematic for an investor when the market unit price of the security is high and the investor wishes to have a diversified portfolio and has little money to invest at any one time. For instance, assume an investor wants to create a diversified portfolio consisting of a large number of blue chip stocks, each having a high price per share. In order to have a sufficiently diversified portfolio, the investor would have to buy shares of several different stocks, which could prove to be prohibitively expensive because of commissions. Moreover, it could be difficult for the investor to manage the acquisition of these shares with small sums of money due to fluctuations in the stock prices. The alternative would be for the investor to save up large sums of cash until the appropriate investments could be made. Such an approach, however, would preclude the opportunity for the investor to take advantage of a systematic investment program (i.e., dollar-cost averaging) and thus limits the investor's ability to slowly build a position in high quality, highly priced securities over time. Also, by the time the investor does manage to save up a large enough sum of cash, it may not be financially beneficial to the investor to invest due to adverse market conditions or other circumstances. Although many companies will typically split their shares to effectively reduce the price per share in order to bring a stock price into the buying range of more investors, even then, many investors still do not have sufficient money on hand at any one time to build a properly diversified portfolio using a systematic investment approach.

The high costs associated with buying and selling small quantities of securities on one of the public financial markets through a brokerage account is another major factor inhibiting individual investors who do invest through brokerage accounts from adopting a systematic investment program. Again, in the case of stocks, investors with larger amounts of investment capital usually buy or sell stocks in multiples of 100 shares, called round lots. Although small investors can buy just a single share or a number less than 100 (called an odd lot), brokers often charge more to buy and sell odd lot orders. The transaction fees associated with buying and selling small quantities of securities become an unacceptable cost for most small, systematic investors.

Some companies, in order to enable their shareholders to buy stock directly from the company (usually through a transfer agent) in very small to moderate amounts, offer what's referred to as a dividend reinvestment plan (DRIP), or offer some other similar plan. These plans give shareholders the option of reinvesting dividends to buy more stock. They also enable shareholders to directly buy additional shares of the company's stock on regularly scheduled trade dates. Although most DRIPs require an investor to own at least one share of stock in the company before enrolling, some DRIPs, called direct stock purchase (DSP) plans, will sell stock directly to the public. One advantage of a DRIP is that transaction costs are low. Another advantage is that once an investor is enrolled in a DRIP, the investor can buy or sell shares in the company without paying a brokerage commission. Several downsides to DRIPs do, however, exist.

First of all, all companies do not offer DRIPs. Thus, the investment options available to DRIP investors are limited. Second, DRIPS have fixed dates on which shares are bought and sold, and these dates are typically far apart. Accordingly, there can be considerable delay between the time an investor desires to make a trade and the shares are actually bought or sold. Finally, in order to build a diversified portfolio using DRIPs, an investor will have to arrange a DRIP with each company in the portfolio. Currently, individual DRIP plans are not coordinated and the costs and complexities that can be associated with arranging and managing a plurality of different DRIP plans can be a time consuming, confusing, and unpleasant experience for many investors. Each DRIP plan will have, for example, it's own set of paperwork that must be completed to participate in the plan, it's own set of rules for investing, its own trading dates, and its own method of issuing account statements. As a result, it would be virtually impossible to develop a diversified DRIP portfolio where, from the point of view of the investor, there is no substantial distinction between the processes for buying and selling shares of any of the stocks in the portfolio, i.e., the process for buying/selling shares of one stock would be substantially the same as the process for buying/selling shares of any of the other stocks.

Another investment vehicle available to investors is the mutual fund. A mutual fund is an investment entity that makes investments on behalf of investors who share common financial goals. When an investor invests in a mutual fund, the investor's money is pooled with other investors' monies. This pool of money is managed by the fund's management that invests the money in one or more types of investments, such as common or preferred stocks, corporate, tax-free municipal, U.S. government or zero-coupon bonds, convertible securities, gold, silver, foreign securities, and real estate. The amount of money invested in a particular investment depends on the fund's objectives and restrictions and on the fund management's perception of the economy.

An investor invests in a mutual fund by buying shares of the fund. In an open-ended fund, the price of the fund's shares is directly related to the value of the investments held by the fund. Mutual funds are popular primarily because they conveniently give investors, even those with small amounts of money to invest, access to a wide variety of professionally manages investment opportunities. Furthermore, mutual funds are popular dollar-cost averaging investment vehicles because they take a large portfolio of securities and divide that portfolio into small enough pieces so that almost any investor can buy or sell an interest in the entire portfolio.

Despite the many benefits of mutual funds, there are some drawbacks. First of all, mutual fund investors have no control over which securities are owned by the fund. As discussed above, in a mutual fund, the fund's management decides where to invest the fund's assets and when to buy, sell, or hold investments for the fund's portfolio. The investor has no choice in the matter. And, with all the attention given to investing today and the general awareness the public has toward individual investment opportunities, individuals today have far more investment savvy than any previous generation. The lack of investment decision-making power associated with mutual funds can prove to be frustrating, especially to the more sophisticated investor. This is particularly true when one considers the capital gains taxes incurred by investors in mutual funds. At the end of each year, a mutual fund pays out its profits and the investors incur capital gains. By not having control of when or what the fund buys or sells, the investors have no control over the tax implications imposed by the fund.

Second, the performance of a mutual fund depends almost entirely on the capabilities of the fund management. Oftentimes, investors, who invest in a particular fund based on the track record of the fund's management, find that the fund's management changes. At this point, the investor is faced with two options. One is to keep invested in the fund with the hope that the new management will be as successful as the prior management. The other is to sell the shares of the fund for reinvestment elsewhere. Neither of these options is necessarily very appealing.

Third, mutual funds can be expensive. A fund's management is paid for its services in the form of a fee that is based on the total value of the fund's assets. Even no-load funds have an annual charge that can average 1.5 percent. Moreover, many mutual funds have other costs, including sales charges, marketing and distribution costs (i.e., 12b-1 costs), contingent deferred sales load (CDSL) and redemption fees, and distribution taxes, which can often be quite high.

Finally, mutual funds are difficult to select. There are currently thousands of mutual funds available to investors and there is no real good way to determine which is best.

While other investment vehicles do exist, they, too, have drawbacks and do not address the problems solved by the present invention.

BRIEF SUMMARY OF THE INVENTION

Accordingly, the present invention is directed to an investment system and method that substantially obviate one or more of the problems due to limitations and disadvantages of the related art.

One advantage of the present invention over the related art is that it offers an investor the ability to develop a customized and diversified portfolio, as is enjoyed by investors of individual securities, together with the ability to develop such a portfolio using a low-cost systematic investment program, as is enjoyed by mutual fund investors.

Another advantage of the present invention over the related art is that it enables an investor with small investment quantities the ability to invest in a plurality of different securities chosen by the investor with sums of money the investor can afford where, from the point of view of the investor, there is no substantial distinction between the processes for buying and selling any of the securities.

Additional features and advantages of the invention will be set forth in the description that follows and, in part, will be apparent from the description, or may be learned by practice of the invention. The objectives and other advantages of the invention will be realized and attained by the system and method particularly pointed out in the written description and claims hereof as well as the appended drawings.

To achieve these and other advantages and in accordance with the purposes of the invention, as embodied and broadly described, the invention provides an investment system comprising at least one investor, at least one financial market, and an investment vehicle. The investment vehicle enables the at least one investor to selectively buy and sell interests in each of a plurality of different individual securities traded on the at least one financial market. For each of the plurality of individual securities, interests in the security which are bought or sold by the at least one investor can correspond to a selected fractionalized market unit of the security.

In a second aspect, the invention provides an investment vehicle for enabling a plurality of investors to selectively buy and sell interests in each of a plurality of different individual securities traded on at least one financial market, comprising a plurality of accounts through which the plurality of investors can buy and sell the interests in the plurality of securities, each of the accounts corresponding to at least one of the plurality of investors; wherein, for each of the plurality of individual securities, interests in the security which are bought or sold by the at least one investor can correspond to a selected fractionalized market unit of the security.

In a third aspect, the invention provides an investment vehicle for enabling a plurality of investors to selectively buy and sell interests in each of a plurality of different individual securities traded on at least one financial market, comprising: a plurality of accounts through which the plurality of investors can transmit orders to buy and sell the interests in the plurality of securities, each of the accounts corresponding to at least one of the plurality of investors; wherein each of the investors is charged a fixed commission for each order that is accepted and acted upon by the investment vehicle on behalf of the investor, the commission being determined irrespective of the number of different securities that are involved with the order, the number of shares of each security involved in the order, the value of the investor's portfolio, and the fact that the order may include requests to both buy and sell interests in securities, and wherein each of the securities involved in the order is allocated a percentage of the commission charged, the percentage being derived by dividing the value of the interest of each security purchased or sold by the total value of the interests of all the securities purchased or sold.

In a fourth aspect, the invention provides an investment vehicle for enabling a plurality of investors to selectively buy and sell interests in each of a plurality of different individual securities traded on at least one financial market, comprising: a plurality of accounts through which the plurality of investors can buy and sell the interests in the plurality of securities, each of the accounts corresponding to at least one of the plurality of investors; wherein the investment vehicle enables the investors to organizing holdings in the corresponding accounts into one or more groups and subgroups, and wherein for each account, the corresponding investor can specify an allocation factor for each security, for each group and for each sub-group included in the account, the allocation factor for a group specifying a percentage of a total amount to be used to purchase interests in securities for the account in which the group is located, the allocation factor for a sub-group specifying a percentage of a total amount to be used to purchase interests in securities for the group in which the sub-group is located, and the allocation factor for a security specifying a percentage of a total amount to be to be used to purchase interests in securities for the group or sub-group in which the security is located, or if the security is not in a group or sub-group, a percentage of the total amount to be used to purchase interests in securities for the account in which the security is located.

In a fifth aspect, the invention provides an investment vehicle for enabling a plurality of investors to selectively buy and sell interests in each of a plurality of different individual securities traded on at least one financial market, comprising: a plurality of accounts through which the plurality of investors can buy and sell the interests in the plurality of securities, each of the accounts corresponding to at least one of the plurality of investors; wherein for each account, the corresponding investor or investors can organizing holdings in the account in a hierarchical nature, and wherein the investor is provided with a visual representation of the account showing the hierarchical nature.

In a sixth aspect, the invention provides an investment vehicle for enabling a plurality of investors to selectively buy and sell interests in each of a plurality of different individual securities traded on at least one financial market, comprising: a plurality of accounts through which the plurality of investors can buy and sell the interests in the plurality of securities, each of the accounts corresponding to at least one of the plurality of investors; wherein the investment vehicle automatically monitors and balances holdings in the accounts in accordance with asset allocations specified by the corresponding investors.

In a seventh aspect, the invention provides an investment vehicle for enabling a plurality of investors to selectively buy and sell interests in each of a plurality of different individual securities traded on at least one financial market, comprising: a plurality of accounts through which the plurality of investors can transmit orders to buy and sell the interests in the plurality of securities, each of the accounts corresponding to at least one of the plurality of investors; wherein each of the orders can include one or more limit requests, and wherein the one or more limit requests can apply to a plurality of securities included in the order.

It is to be understood that both the foregoing general description and the following detailed description are exemplary and explanatory and are intended to provide further explanation of the invention as claimed.

BRIEF DESCRIPTION OF THE SEVERAL VIEWS OF THE DRAWINGS

The accompanying drawings, which are included to provide a further understanding of the invention and are incorporated in and constitute a part of this specification, illustrate several embodiments of the invention and, together with the written description, serve to explain the principles of the invention. In the drawings:

FIG. 6 is a diagram illustrating several valid buy and sell orders according of the investment system of FIG. 1;

DETAILED DESCRIPTION OF THE INVENTION

Reference will now be made in detail to the presently preferred embodiments of the invention, examples of which are illustrated in the accompanying drawings.

Figure 1:
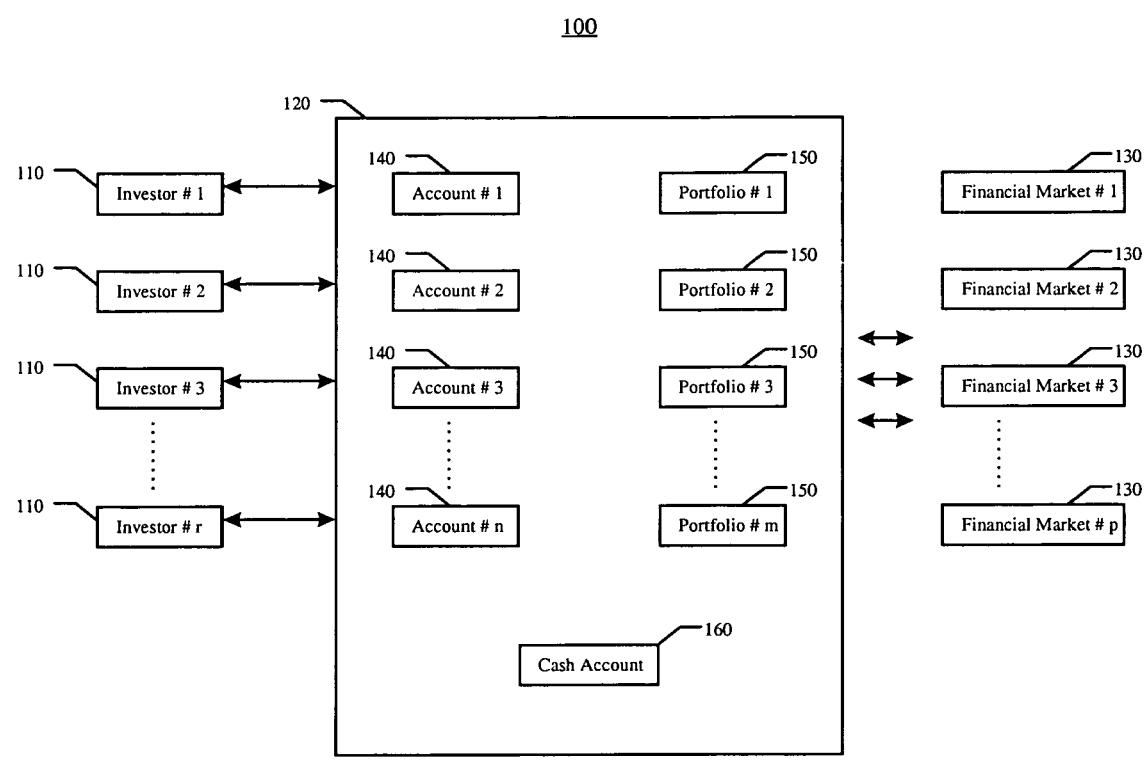
FIG. 1 is a block diagram of an investment system according to the present invention.

An investment system according to the present invention is shown in FIG. 1 and is designated generally by reference numeral 100. As embodied herein, the investment system 100 comprises one or more investors 110, an investment vehicle 120, and one or more financial markets 130. Each of the investors 110 can be any type of investor, including, but not limited to, an individual investor or an institutional investor. Further, each of the financial markets 130 can be any type of public financial market or exchange on which a particular security can be traded. For example, when referring to stocks, the financial markets 130 can be any public stock market or exchange, including the New York Stock Exchange (NYSE), the American Stock Exchange (AMEX), an electronic stock exchange, such as NASDAQ, a regional stock exchange, such as the Pacific, Chicago, Cincinnati, Boston, or Philadelphia exchanges, the over-the-counter (OTC) market, or a foreign stock exchange. When referring to bonds, the financial markets 130 can be any public bond market, including a primary market, where bonds are issued directly from a company, the U.S. Treasury, cities, states, or federal, state and local government agencies, a secondary market, where bonds are bought and sold after issue through brokers, or the NYSE or AMEX, which also list a large number of bonds.

The investment vehicle 120 can comprise people, computer hardware, computer software, documentation, or any combination of the foregoing. However, the investment vehicle 120 is preferably implemented using a programmed computerized data processing system, including one or more central processing units for performing data processing steps as described herein, storage devices and databases for storing account and portfolio information as described herein, and communications interfaces for enabling communication between the investment vehicle 120, the investors 110, and the financial markets 130 as described herein. For example, the investment vehicle 120 and investors 110 can form an Internet-based client-server system, wherein the investment vehicle 120 acts as the server and each of the investors 110 can access the investment vehicle 120 over the Internet via a client station. Furthermore, although the investment vehicle 120 may be administered by a single entity, it is possible for the investment vehicle 120 to be administered by a plurality of entities.

Generally, the investment vehicle 120 enables each of the investors 110 to buy, sell, and hold an interest in each of a plurality of securities traded on the financial markets 130. For each security, the interest can correspond to a positive whole number multiple of the market unit of the security or a fractionalized market unit of the security. Preferably, the investment vehicle 120 is structured such that, from the point of view of the investors 110, the processes for buying, selling, and holding interests in any of the securities traded on the financial markets 130 are substantially the same as the processes for buying, selling, and holding interests in any of the other securities traded on the financial markets 130. The investment vehicle 120 is also preferably structured such that each of the investors 110 can buy, sell, and hold interests in any of the securities traded on the financial markets 130, and such that each of the investors 110 can do so independently of actions to buy, sell, and hold taken by any of the other investors 110. It should be understood, however, that in certain situations, the administrator of the investment vehicle 120 may limit the choices available to any or all of the investors 110 to a predetermined group of securities in order to minimize operating expenses and simplify administration of the investment vehicle 120 and/or to meet certain business objectives of the investment vehicle 120. In such situations, the choices made available to any particular one of the investors 110 can be the same as or different from the choices made available to the other investors 110.

As further shown in FIG. 1, the investment vehicle 120 comprises a plurality of accounts 140. The investors 110 buy, sell, and hold interests in securities through their respective accounts 140 an a manner similar to the manner in which investors buy, sell, and hold securities in a conventional brokerage account. Preferably, there is one account 140 corresponding to each of the investors 110, although it is possible for one or more of the investors 110 to either share an account with other investors, e.g., to have a joint account, or have multiple accounts.

As still further shown in FIG. 1, the investment vehicle 120 comprises one or more portfolios 150. Each of the portfolios 150 holds either a positive whole number multiple of the market unit or a fractionalized market unit of a specific security. The whole number multiple of the market unit or fractionalized market unit of the security can be bought (either directly or through one or more third parties) by the investment vehicle 120 on one of the financial markets 130, and/or transferred to the investment vehicle 120 by one or more third parties (e.g., transferred by another investment vehicle). Preferably, there is one portfolio 150 corresponding to each of the securities in which interests can be bought, sold, and held by the investors 110. It should be noted that the portfolios 150 do not have to be physically separate (e.g., stored as separate files in a computerized database) from one another. Rather, it is intended that the portfolios need only be logically separate from one another, i.e., the contents of each portfolio are somehow distinguishable from the contents of the other portfolios. Thus, for example, the portfolios 150 may be organized into a single file on a computerized database, or organized into several files on several computerized databases with each of the several files containing data from multiple portfolios, so long as the contents of each portfolio are somehow distinguishable from the contents of the other portfolios.

Figure 2:
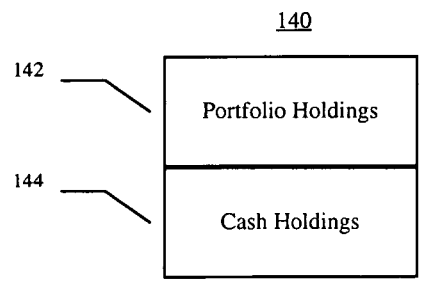
FIG. 2 is a block diagram of an account of the investment vehicle of FIG. 1.
Figures 4A, 4B, 4C:
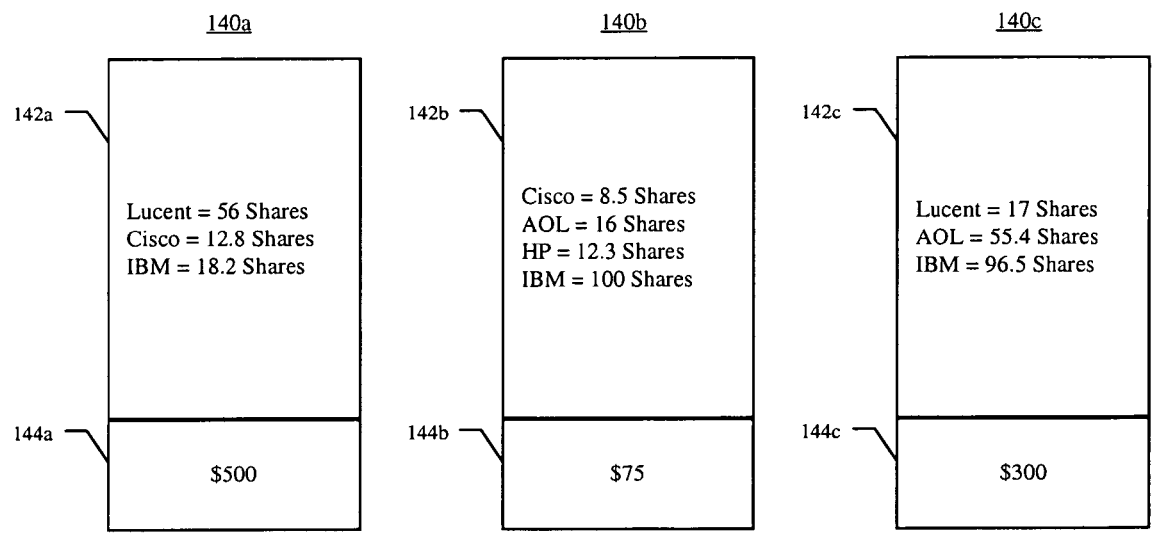
FIGS. 4A-4C are diagrams of examples of accounts of the investment vehicle of FIG. 1.

As shown in FIG. 2, associated with each account 140 are portfolio holdings 142 and cash holdings 144. The portfolio holdings 142 represent the interests, if any, that the account owner has in securities held by the portfolios 150. The cash holdings 144 represent the value of any cash or other liquid assets owned by the account owner and held in the account 140. For example, given the account scenarios show in FIGS. 4A-4C, in the account 140*a*, the portfolio holdings 142*a* represent 56 shares of Lucent stock, 12.8 shares of Cisco stock, and 18.2 shares of IBM stock, while the cash holdings 144*a* represent $500 in liquid assets. In the account 140*b*, the portfolio holdings 142*b* represent 8.5 shares of Cisco stock, 16 shares of AOL stock, 12.3 shares of HP stock, and 100 shares of IBM stock, while the cash holdings 144*a* represent $75 in liquid assets. In the account 104*c*, the portfolio holdings 142*c* represent 17 shares of Lucent stock, 96.5 shares of IBM stock, and 55.4 shares of AOL stock, while the cash holdings 144*c* represent $300 in liquid assets.

Figure 3:
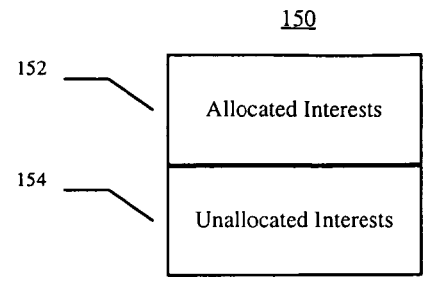
FIG. 3 is a block diagram of a portfolio of the investment vehicle of FIG. 1.

As shown in FIG. 3, associated with each portfolio 150 are allocated interests 152 and unallocated interests 154. For each of the portfolios 150, the allocated interests 152 represent the aggregate of interests of those portions of the portfolio holdings 142 for all of the accounts 140, which portions are associated with the particular security held by the portfolio 150. For example, given the account scenarios shown in FIGS. 4A-C, the allocated interests 152 of the portfolio 150 for Lucent would be 73 shares, the allocated interests 152 of the portfolio 150 for Cisco would be 21.3 shares, the allocated interests 152 of the portfolio 150 for IBM would be 214.7 shares, the allocated interests 152 of the portfolio 150 for AOL would be 71.4 shares, and the allocated interests 152 of the portfolio 150 for BP would be 12.3 shares. For each portfolio 150, the unallocated interests 154 represent interests in the security held by the portfolio 150 that have not been allocated to one of the accounts 140.

Referring back to FIG. 1, the investment vehicle 120 may further comprise a cash account 160. The cash account 160 comprises cash or other liquid assets that may be used by the investment vehicle 120 to supplement monies invested by the investors 110 in order to buy securities on the financial markets 130 or otherwise obtain the securities to fulfill buy orders on behalf of the investors 110. The investment vehicle 120 may also use the cash account 160 to buy securities on the financial markets 130 or otherwise obtain the securities on behalf of the investment vehicle 120. Although FIG. 1 illustrates the cash account 160 as being a single account associated with the entire investment vehicle 120, the cash account 160 can alternatively or concurrently comprise a plurality of separate or linked accounts, one corresponding to each of the portfolios 150.

Figure 5:
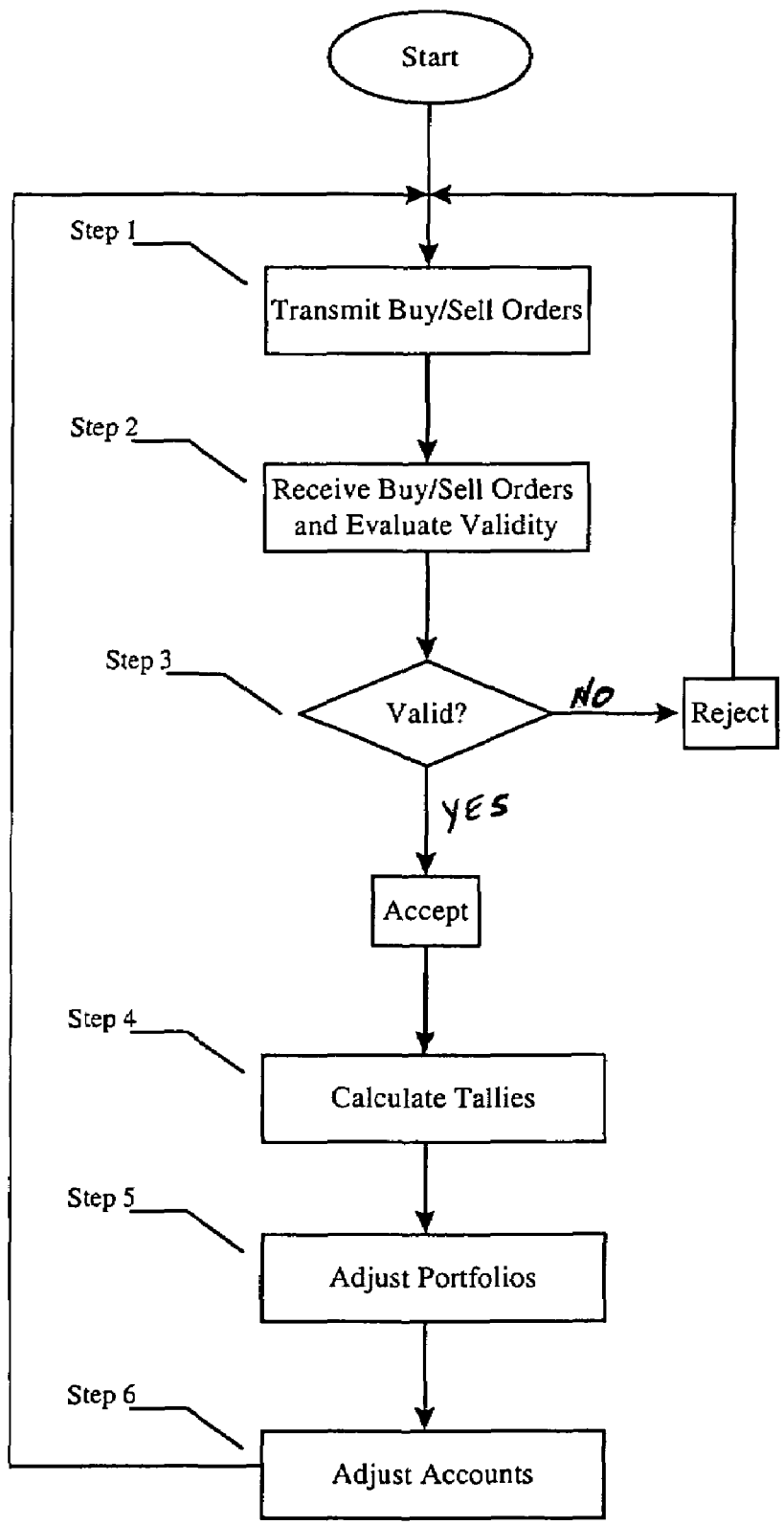
FIG. 5 is a flow diagram depicting an operation of the investment system of FIG. 1.

A preferred operation of the investment system 100 will now be described with reference to the flow diagram illustrated in FIG. 5. In order to simplify the description of the operation, it is assumed that the investment vehicle 120 enables each of the investors 110 to buy, sell, and hold interests in the shares of stocks of only five companies A-E. Accordingly, it is also assumed that there is one portfolio 150 corresponding to each of companies A-E, where each portfolio holds a positive whole number multiple of shares or fractionalized shares of stock of the corresponding company.

In step 1, the investors 110 transmit orders to buy and/or sell interests in the stocks of one or more of the companies A-E as selected by each investor. These orders are transmitted to the investment vehicle 120 through the respective investor accounts 140 via any viable communication method known to those skilled in the art, including secure Internet transactions, mailed documentation, and telephone orders. As was previously mentioned, each of the investors 110 can buy and sell interests corresponding to a positive whole number multiple of a share or a fractionalized share of the stock of any of the companies A-E. Moreover, each of the investors 110 can buy and sell those interests independently of the decisions made by the other investors 110.

It should be appreciated that a single order can include requests to buy and/or sell interests in the stocks of one or more of the companies A-E. For example, a single order can include a request to buy an interest in company A, a request to buy another interest in company B, and a request to sell an interest in company C.

Further, it should be appreciated that an order can take any number of forms. For example, an order can specify a total amount of money to be invested and designate by, for example, percentages of that total amount how the money should be allocated to buy interests in the shares of selected ones of the companies A-E. Thus, an order can specify that a total amount of $100 is to be invested with 20% being allocated to purchasing an interest in shares of company A, 25% being allocated to purchasing an interest in shares of company B, and 55% being allocated to purchasing an interest in shares of company E. Further, an order can simply specify for one or more of the companies A-E an amount of money to be invested to buy interests in the shares of the companies. Thus, an order can specify that $20 is to be allocated to purchasing an interest in shares of company A, $10 is to be allocated to purchasing an interest in shares of company C, $60 is to be allocated to purchasing an interest in shares of company D, and $10 is to be allocated to purchasing an interest in shares of company E. When selling interests in a stock, an order preferably specifies a number of shares (again, either a positive whole number multiple of a share or a fractionalized share) of the stock in which an interest is to be sold. The reason for this is that the number of shares corresponding to the interests held in the portfolio holdings 142 of each account 140 remains constant over time, even if the values of those shares change.

Still further, an order can include one or more restrictions as determined by each of the investors 110. For example, an investor 110 can specify that an order be acted on only upon the occurrence of a specific event, such as a stock reaching a certain price, a specific date or time, or a market index reaching a certain level.

In step 2, the investment vehicle 120 receives the orders from the investors 110 and evaluates their validity. In particular, the investment vehicle 120 determines whether the orders, the relevant investors 110, and/or the relevant accounts 140 meet certain criteria. Such criteria can be set by the administrator of the investment vehicle 120 in order to fulfill certain business or administrative objectives. Similarly, such criteria can be set by the administrator of the investment vehicle 120 in order to comply with certain laws, rules, and regulations relating to the trading of securities.

For example, in the case of an order to sell an investor's interest in a stock, the investment vehicle 120 may evaluate whether there are sufficient interests in the investor's portfolio holdings 142 to cover the order. In the case of an order to buy an interest in a stock, the investment vehicle 120 may evaluate whether the investor has appropriate funds in the investor's cash holdings 144 or has otherwise arranged to make available appropriate funds, which the investment vehicle 120 can access to cover the order. For example, it is possible for the investor to have a certain amount of time after transmitting the order within which to ensure that the appropriate funds are in the cash holdings 144 of the investor's account 140. Likewise, it is also possible for the investor to transmit an order to buy stocks "on margin" based upon the value of any portfolio holdings 142 in the investor's account 140. In either case, an investor can transfer funds to the cash holdings 144 of the investor's account 140 in a variety of ways known to those skilled in the art. Thus, the investor can mail a check or money order to the investment vehicle 120 or can transfer the funds using an electronic fund transfer system. The investor can likewise direct the investment vehicle 120 to transfer to the cash holdings 144 of the investor's account 140 the proceeds resulting from the sale of some or all of the investor's portfolio holdings 142.

In step 3, if the investment vehicle 120 determines that a particular order is invalid, the investment vehicle 120 rejects the order and sends notification of the rejection to the investor 110 that placed the order. Preferably, the notification of rejection includes an explanation as to why the order was rejected so that the investor 110 is aware of the problem and may take remedial action (e.g., modify and re-transmit the order) if appropriate. If, however, the investment vehicle 120 determines that a particular order is valid, the investment vehicle 120 accepts the order. The investment vehicle 120 also preferably sends notification of the acceptance to the investor 110 that placed the order. Processing then continues to step 4.

Preferably, at some point either during step 2 or step 3, or after completion of step 2 or step 3, the investment vehicle 120 prompts the respective investor 110 for confirmation from the investor 110 that the transmitted order is accurate, i.e., that the order received by the investment vehicle 120 is, in fact, the order intended by the investor 110. This prompt allows the investor 110 the opportunity to make modifications to the order or cancel the order altogether. Preferably, once the investor 110 provides confirmation to the investment vehicle 120 that the order is accurate, the investor 110 can modify or cancel the order up until a certain time, such as when the investment vehicle 120 calculates the tallies in step 4 below. Alternatively, the investor 110 is prohibited from modifying or canceling the order once the investor 110 provides the confirmation.

In step 4, the investment vehicle 120 calculates a tally, for each of the companies A-E, based on all valid orders received during a predetermined period of time. The predetermined period of time can be determined chronologically, e.g., by a certain time or times of the day, according to the happening of one or more events, e.g., the accumulation of a certain number or value of valid orders, or a combination of both. For example, given the scenario illustrated in FIG. 6, where during the predetermined period of time the investment vehicle 120 receives only the valid orders for companies A, B, and C as shown, the investment vehicle 120 would calculate a buy tally of $284.90 and a sell tally of 14.41 shares for company A, a buy tally of $963.00 and a sell tally of 8.8 shares for company B, and a buy tally of $200.00 and a sell tally of 4 shares for company C.

In step 5, based on the tallies calculated in step 4 for each of the companies A-E, the investment vehicle 120 makes appropriate adjustments to the respective portfolios 150 to fulfill each of the valid orders for each company's stock. These adjustments can involve: (1) buying positive whole number multiples of shares of the company's stock on one of the financial markets 130 and designating interests in those shares as allocated interests 152 and/or unallocated interests 154; (2) selling positive whole number multiples of shares of the company's stock on one of the financial markets 130; (3) re-designating unallocated interests 154 in shares of the company's stock as allocated interests 152; (4) re-designating allocated interests 152 in shares of the company's stock as unallocated interests 154; and/or (5) transferring interests in shares (either whole number multiples of shares or fractionalized shares) of the company's stock to and/or from one or more third parties. It should be appreciated that in some cases, the appropriate adjustment is no adjustment at all. Further, for each of the companies A-E, the adjustments to the company's portfolio 150 can be made based upon the buy tally and the sell tally separately, or based upon the net difference between the values of the buy tally and the sell tally.

The investment vehicle 120 can carry out step 5 in a variety of ways known to those skilled in the art. The manner in which the investment vehicle 120 adjusts the portfolios 150 will typically depend on several factors, including the number of allocated interests 152 and unallocated interests 154 in the portfolios 150, the amount of liquid assets in the cash account 160, and the objectives of the investment vehicle 120.

In order to illustrate the foregoing principles, an example will be discussed with reference to the scenario illustrated in FIG. 6. Referring to FIG. 6, it is again assumed that during the predetermined period of time the investment vehicle 120 receives only the valid orders for companies A, B, and C as shown. It is also assumed that the stock of company A is trading at $120 per share, the stock of company B is trading at $85 per share, and the stock of company C is trading at $50 per share on the financial markets 130.

With regard to company A, based on the buy tally alone, the investment vehicle 120 will ensure that the allocated interests 152 in company A's portfolio 150 are increased by an amount corresponding to 2.37 shares of company A's stock. This increase in the number of allocated interests 152 can be accomplished by (1) purchasing positive whole number multiples of shares of company A's stock on the financial markets 130 (using liquid assets in the cash account 160 and/or the $284.90 from the cash holdings 144 of the appropriate accounts 140) and designating interests in all or a portion of those shares as allocated interests 152, (2) re-designating unallocated interests 154 as allocated interests 152, (3) transferring interests in shares (either whole number multiples of shares or fractionalized shares) of the company's stock to the portfolio 150 from one or more third parties, or (4) a combination of (1), (2), and/or (3). For example, the investment vehicle 120 could purchase three shares of company A's stock on one of the financial markets 130 using the $284.90 from the buy orders and $75.10 from the cash account 160, and designate interests corresponding to 2.37 of the purchased shares as allocated interests 152 and designate interests corresponding to 0.63 of the purchased shares as unallocated interests 154. Alternatively, the investment vehicle 120 could use $240.00 of the $289.90 from the buy orders to purchase two shares of company A's stock on one of the financial markets 130, designate interests corresponding to the two purchased shares as allocated interests 152, and re-designate 0.37 unallocated interests 154 as allocated interests 152.

Further, based on the sell tally alone, the investment vehicle 120 will ensure that the allocated interests 152 in company A's portfolio 150 are decreased by an amount corresponding to 14.41 shares of company A's stock. This decrease in the number of allocated interests 152 can be accomplished by (1) selling positive whole number multiples of shares of company A's stock on the financial markets 130, (2) re-designating allocated interests 152 as unallocated interests 154, (3) transferring interests in shares (either whole number multiples of shares or fractionalized shares) of the company's stock from the portfolio 150 to one or more third parties, or (4) a combination (1), (2), and/or (3). For example, the investment vehicle 120 could sell 14 shares of company A's stock on the financial markets 130 and re-designate 0.41 allocated shares 152 as unallocated shares 154.

Alternatively, based upon the net difference between the values of the buy tally and the sell tally for company A, the investment vehicle 120 will simply ensure that the allocated interests 152 in company A's portfolio 150 are decreased by an amount corresponding to 12.04 shares of company A's stock. Again, this decrease in the allocated interests 152 can be accomplished by (1) selling positive whole number multiples of shares of company A's stock on the financial markets 130, (2) re-designating allocated interests 152 as unallocated interests 154, (3) transferring interests in shares (either whole number multiples of shares or fractionalized shares) of the company's stock from the portfolio 150 to one or more third parties, or (4) a combination (1), (2), and/or (3).

With regard to company B, based on the buy tally alone, the investment vehicle 120 will ensure that the allocated interests 152 in company B's portfolio 150 are increased by an amount corresponding to 11.33 shares of company B's stock. And, based on the sell tally alone, the investment vehicle 120 will ensure that the allocated interests 152 in company B's portfolio 150 are decreased by an amount corresponding to 8.8 shares of company B's stock. Alternatively, based upon the net difference between the values of the buy tally and the sell tally for company B, the investment vehicle 120 will simply ensure that the allocated interests 152 in company B's portfolio 150 are increased by an amount corresponding to 2.53 shares of company B's stock.

With regard to company C, based on the buy tally alone, the investment vehicle 120 will ensure that the allocated interests 152 in company C's portfolio 150 are increased by an amount corresponding to 4 shares of company C's stock and, based on the sell tally alone, will ensure that the allocated interests 152 in company C's portfolio 150 are decreased by an amount corresponding to 4 shares of company C's stock. Alternatively, based upon the net difference between the values of the buy tally and the sell tally for company C, the investment vehicle 120 will make no adjustment to the portfolio 150 for company C.

It should be appreciated that, for each of the portfolios 150, the investment vehicle 120 can correct for any share price fluctuations between the time the buy and sell orders are tallied and the time actual trades are made on the financial markets 130 using liquid assets in the cash account 160 and/or unallocated interests 154 according to desired accounting practices.

Further, when making adjustments to the portfolios 150 based upon the buy tallies alone or based upon the net differences between the values of the buy and sell tallies, the investment vehicle 120 can convert the buy tallies from a dollar amount to a share amount by rounding up or down to any desired decimal place (in the scenario of FIG. 6, the share amounts were rounded up to two decimal places). Again, any necessary corrections due to this rounding up or down can be made by the investment vehicle 120 using liquid assets in the cash account 160 and/or unallocated interest 154 according to desired accounting practices.

Still further, it should be appreciated that the investment vehicle 120 may, at any time, buy, sell, and hold interests in the shares of stocks of the companies A-E on behalf of the investment vehicle 120. Such interest could be held as unallocated interests 154 in the appropriate portfolios 150 or could be held in an account 110 owned by the investment vehicle 120.

Finally, the investment vehicle 120 can preferably control the number of unallocated interests 154 in each of the portfolios 150 to meet the objectives of the investment vehicle 120. For example, for each of the portfolios 150, the investment vehicle 120 can at all times maintain the number of unallocated interests 154 to correspond to less than one share.

In step 6, once the appropriate adjustments to each of the portfolios 150 have been made, the investment vehicle 120 adjusts the portfolio holdings 142 and the cash holdings 144 of each of the accounts 140 to reflect the valid orders that the investors 110 have made. In particular, for each account 140, proceeds from interests in shares sold are placed into the cash holdings 144, interests in shares bought are placed into the portfolio holdings 142, and funds used for buying interests in shares are removed from the cash holdings 144.

For example, given the scenario shown in FIG. 6, with respect to company A, the following adjustments would be made: (1) the account 150 that placed the $118.00 buy order would see an increase of 0.98 of company A's shares in its portfolio holdings 142 and a decrease of $118.00 in it's cash holdings 144; (2) the account 150 that placed the 8 share sell order would see a decrease of 8 of company A's shares in its portfolio holdings 142 and an increase of $960.00 in it's cash holdings 144; (3) the account 150 that placed the $12.50 buy order would see an increase of 0.10 of company A's shares in its portfolio holdings 142 and a decrease of $12.50 in it's cash holdings 144; (4) the account 150 that placed the $81.30 buy order would see an increase of 0.68 of company A's shares in its portfolio holdings 142 and a decrease of $81.30 in it's cash holdings 144; (5) the account 150 that placed the $73.10 buy order would see an increase of 0.61 of company A's shares in its portfolio holdings 142 and a decrease of $73.10 in it's cash holdings 144; and (6) the account 150 that placed the 6.41 share sell order would see a decrease of 6.41 of company A's shares in its portfolio holdings 142 and an increase of $769.20 in it's cash holdings 144. Similar adjustments would be made to the accounts 150 with respect to the orders for companies B and C. The adjustments to the accounts 140 could also take into account any transaction fees imposed by the investment vehicle 120 on the investors 110 for the orders.

In addition to the foregoing features of the present invention, the following additional features can also be implemented in the present invention, either individually or in any combination, to enhance the performance and versatility of the present invention as compared to currently available investment vehicles. Moreover, these additional features can also be applied to conventional investment vehicles as well.

Commission Structures and Allocation

In one embodiment of the present invention, the investor 110 is charged a fixed commission for each order that is accepted and acted upon by the investment vehicle 120, irrespective of (1) the number of different securities that are involved with the order, (2) the number of shares of each security involved in the order, (3) the value of the investor's portfolio, and (4) the fact that the order may include requests to both buy and sell interests in securities. For example, if an order includes a request to buy $20 worth of Lucent stock, a request to buy $70 worth of IBM stock, and a request to sell $10 worth of Cisco stock, the investor 110 will be charged a fixed commission irrespective of (1) the fact that three different stocks are involved in the order, (2) the number of shares of each stock that are bought/sold, (3) the value of the investor's portfolio, and (4) the fact that the order includes a request to both buy and sell interests in the stocks.

In another embodiment, the investor 110 is charged a fixed commission for each order that is accepted and acted upon by the investment vehicle 120, except that if the order includes requests to both buy and sell interests in securities (such as in the foregoing example), the investor 110 will be charged a first commission for the request(s) to buy the interests in the securities and a second commission (which may be different than or the same as the first commission) for the request(s) to sell the interests in the securities. Again, as in the previous embodiment, the first and second commissions are fixed irrespective of (1) the number of different securities that are involved with the order, (2) the number of shares of each of those securities, and (3) the value of the investor's portfolio.

In still another embodiment, the investor 110 is charged a fixed commission for each order that is accepted and acted upon by the investment vehicle 120 in accordance with the number of different securities that are involved in the order, irrespective of (1) the number of shares of each of those securities, (2) the value of the investor's portfolio, and (3) the fact that the order may include requests to both buy and sell interests in securities. For example, in the case where an order involves the purchase and/or sale of X number of different securities, a first commission would be charged if X is between 1 and 5, a second commission would be charged if X is between 6 and 10, a third commission would be charged if X is between 11 and 15, and so on.

In yet another embodiment, the investor 110 is charged a fixed commission for each order that is accepted and acted upon by the investment vehicle 120 in accordance with a combination of two or more of the following: (1) the number of different securities that are involved with the order, (2) the number of shares of each security involved in the order, (3) the value of the investor's portfolio, and (4) the fact that the order may include requests to both buy and sell interests in securities.

As is known to those skilled in the art, commissions are factored into the cost of a security and have a tax implication for computing capital gains and losses. Thus, it is important for investors to keep track of commissions and to be able to allocate the commissions to the purchase and sale of specific securities. Accordingly, once a commission is determined for a particular order, each of the securities involved in the order is allocated a percentage of the commission. The percentage is derived by dividing the value of the interest of each security purchased or sold by the total value of the interests of all the securities purchased or sold. For example, in the case where the investor 110 transmits an order to purchase $20 worth of Lucent stock, $70 of IBM stock, and $10 worth of Cisco stock, assuming a commission of $X is charged for the order, X(20%) commission will be allocated to the purchase of the Lucent stock, X(70%) commission will be allocated to the purchase of the IBM stock, and X(10%) commission will be allocated to the purchase of the Cisco stock.

It should be appreciated that the foregoing commission structures are in sharp contrast to commission structures used by current investment vehicles where commissions are based on the number of shares of each security purchased or sold or on the value of the investor's portfolio. Moreover, with such current commission structures, investors must always be concerned with the value of the investor's portfolio or the number of shares of each security involved in an order, since both may effect the commission charged. To the contrary, with those of the foregoing commission structures of the present invention where the commission is set irrespective of (1) the number of different securities that are involved with the order and (2) the number of shares of each security involved in the order, the investor need not have such a concern and can, therefore, be free to develop an investing program at a predetermined commission cost regardless of the level of diversification. Furthermore, with the commission allocation feature of the present invention, the investor will be able to easily match any commissions charged to specific securities for tax purposes regardless of the level of investment activity of the investor and irrespective of the commission structure used.

Account Groupings

In another embodiment of the present invention, each of the investors 110 has the option of organizing the holdings (portfolio holdings 142 and/or cash holdings 144) of one or more of the investor's accounts 140 into one or more groups. The groups are preferably defined by the investor 110 alone, but may alternatively be defined by the administrator of the investment vehicle 120 or by both the investor and the administrator of the investment vehicle 120 (e.g., the groups may be defined by the investor, but subject to certain rules dictated by the administrator). Also, the groups can preferably be defined by any number of parameters, including but not limited to security type (e.g., domestic or international stocks or bonds, small-, mid- or large-capitalization stocks, value equities, growth equities, etc.), by related industry sector (pharmaceutical, electronics, telecommunications, automotive, etc.), or by investment motive (e.g., preferred tax treatment, retirement, college fund, etc.). Furthermore, each of the groups can preferably have a single-tiered or multi-tiered structure.

Figure 7A:
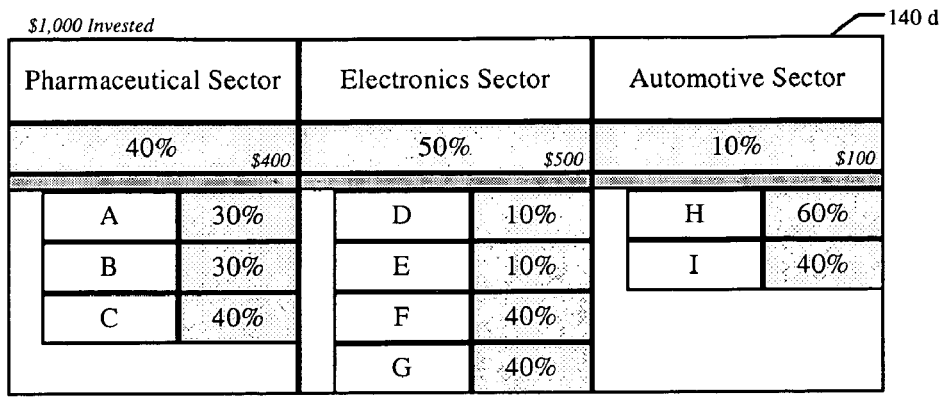
FIGS. 7A through 7C are block diagrams of alternative accounts of the investment vehicle of FIG. 1.
Figure 7B:
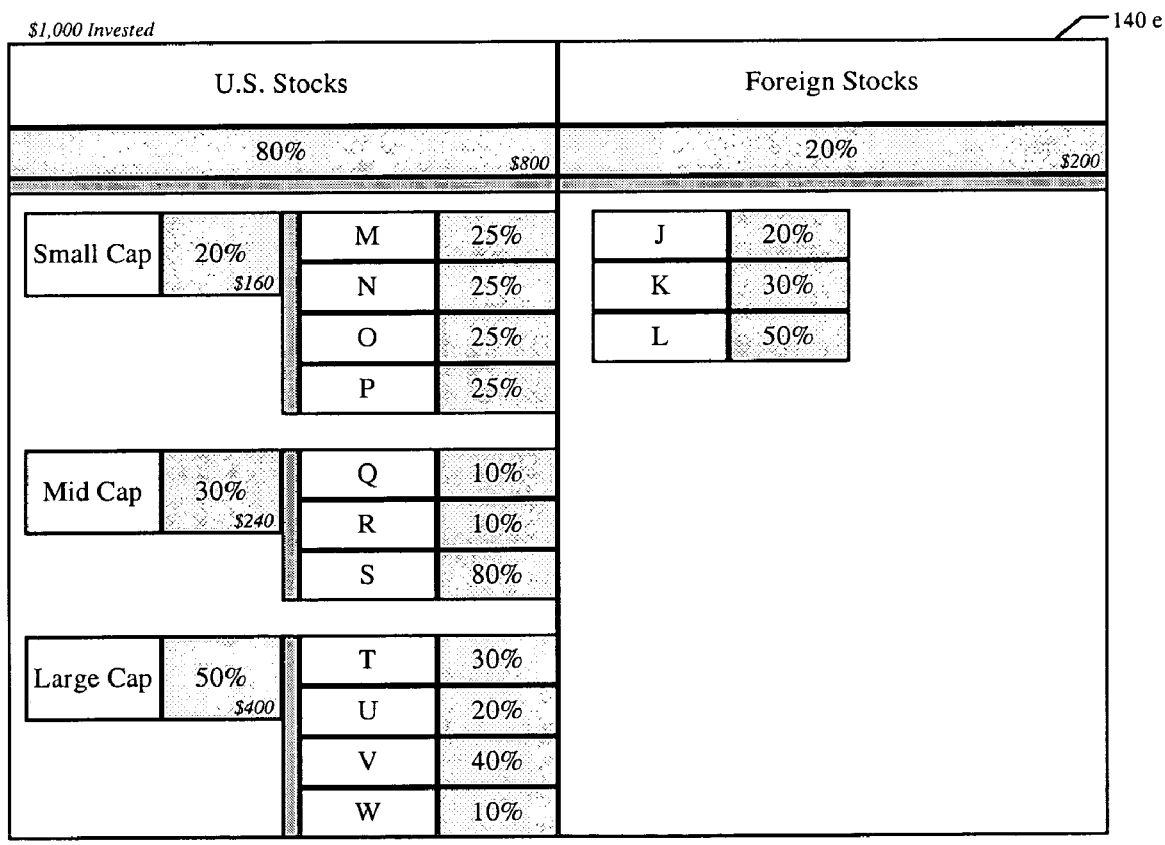

FIGS. 7A and 7B illustrate examples of account structures having the aforementioned groups. As shown in FIG. 7A, account 140d includes three groups designated "Pharmaceutical Sector," "Electronics Sector," and "Automotive Sector." Each of the groups has a single-tiered structure and, as indicated by the group designations, includes stocks of a specific industry sector. Specifically, the Pharmaceutical Sector group includes stocks A-C, which are in the pharmaceutical sector, the Electronics Sector group includes stocks D-G, which are in the electronics sector, and Automotive Sector group includes stocks H and I, which are in the automotive sector. As shown in FIG. 7B, account 140e includes two groups designated "US Stocks" and "Foreign Stocks." The Foreign Stocks group has a single-tiered structure and includes non-US stocks J-L. The US Stocks group, however, has a multi-tiered structure. Specifically, the US Stocks group includes the sub-groups designated "Small Cap," "Mid Cap," and "Large Cap." Each of the sub-groups in the US Stocks group includes stocks corresponding to the sub-group designation. In particular, the Small Cap sub-group includes US small-capitalization stocks M-P, the Mid Cap sub-group includes US mid-capitalization stocks Q-S, and the Large Cap sub-group includes large-capitalization stocks T-W.

Figure 7C:
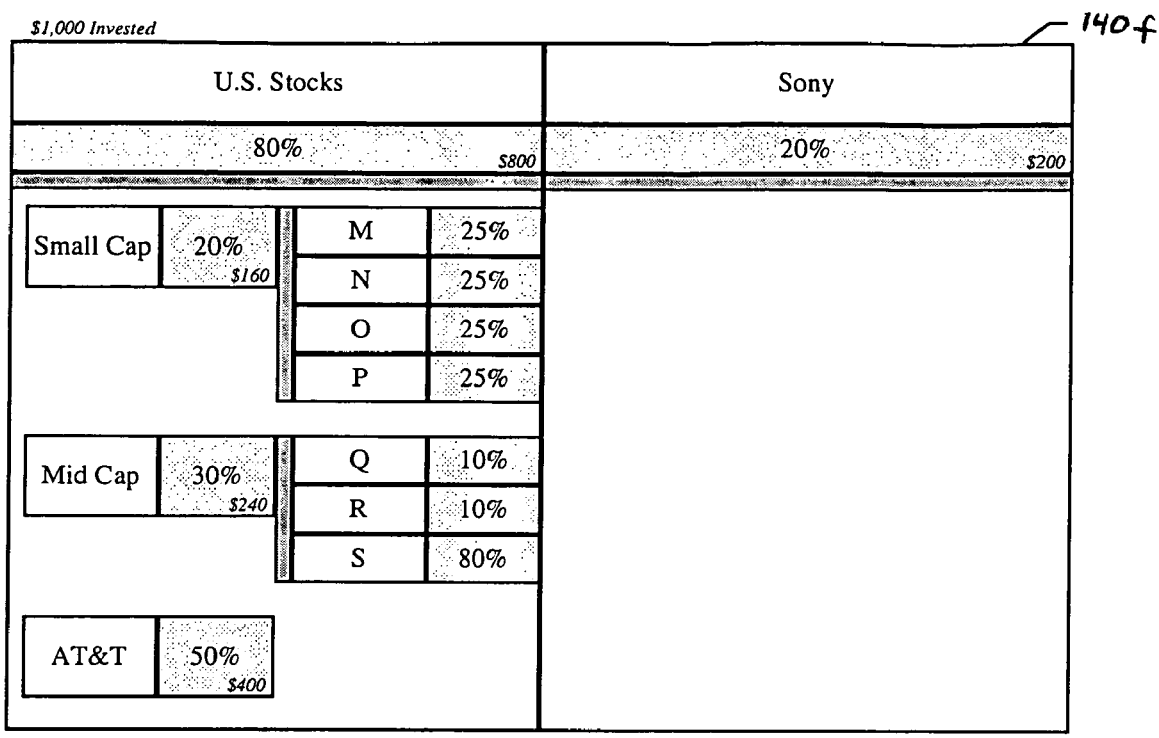

It should be appreciated that a multi-tiered group structure according to the present invention is flexible and can be extended such that sub-groups may have their own sub-groups. Moreover, in both single- and multi-tiered group structures according to the present invention, individual securities may be placed at the same level in the structure as a group or a subgroup. For example, as shown in FIG. 7C, account 140f includes Sony stock at the same level in the account structure as the US Stocks group and includes AT&T stock at the same level in the account structure as the Small Cap and Mid Cap sub-groups.

To facilitate the purchasing of interests in securities for an account having the aforementioned group structures, an investor 110 can specify an "allocation factor" for each security, for each group, and for each sub-group included in the account. The allocation factor for a group specifies a percentage of a total amount to be used to purchase interests in securities for the account in which the group is located, and the allocation factor for a sub-group specifies a percentage of a total amount to be used to purchase interests in securities for the group in which the sub-group is located. The allocation factor for a particular security specifies a percentage of a total amount to be to be used to purchase interests in securities for the group (or sub-group as the case may be) in which the security is located, or if the security is not in a group or sub-group, a percentage of the total amount to be used to purchase interests in securities for the account in which the security is located. Having established these allocation factors, the investor 110 can transmit an order that simply specifies a total amount to be used for purchasing interests in securities for the entire account and the investment vehicle 120 will automatically purchase or otherwise obtain interests in the appropriate securities in accordance with the relevant allocation factors.

For example, referring to FIG. 7A, assuming the investor 110 has specified the allocation factors shown and has transmitted an order specifying that a total of $1,000 is to be used for purchasing additional interests in stocks for the account 140d, the investment vehicle 120 will automatically use the following amounts to purchase or otherwise obtain interests in stocks A-I:

TABLE 1

| STOCK | AMOUNT |
|---|---|
| A | $120.00 |
| B | $120.00 |
| C | $160.00 |
| D | $ 50.00 |
| E | $ 50.00 |
| F | $200.00 |
| G | $200.00 |
| H | $ 60.00 |
| I | $ 40.00 |

Similarly, referring to FIG. 7B, assuming the investor 110 has specified the allocation factors shown and has transmitted an order specifying that a total of $1,000 is to be used for purchasing additional interests in stocks for the account 140e, the investment vehicle 120 will automatically use the following amounts to purchase or otherwise obtain interests in stocks J-W:

TABLE 2

| STOCK | AMOUNT |
|---|---|
| J | $ 40.00 |
| K | $ 60.00 |
| L | $100.00 |

TABLE 2-continued

| STOCK | AMOUNT |
|---|---|
| M | $ 40.00 |
| N | $ 40.00 |
| O | $ 40.00 |
| P | $ 40.00 |
| Q | $ 24.00 |
| R | $ 24.00 |
| S | $192.00 |
| T | $120.00 |
| U | $ 80.00 |
| V | $160.00 |
| W | $ 40.00 |

Also, referring to FIG. 7C, assuming the investor 110 has specified the allocation factors shown and has transmitted an order specifying that a total of $1,000 is to be used for purchasing additional interests in stocks for the account 140f, the investment vehicle 120 will automatically use the following amounts to purchase or otherwise obtain interests in Sony stock, AT&T stock, and stocks M-S:

TABLE 3

| STOCK | AMOUNT |
|---|---|
| Sony | $200.00 |
| M | $ 40.00 |
| N | $ 40.00 |
| O | $ 40.00 |
| P | $ 40.00 |
| Q | $ 24.00 |
| R | $ 24.00 |
| S | $192.00 |
| AT&T | $400.00 |

Preferably, an investor 110 can specify allocation factors for all securities, groups, and sub-groups of an account, as described above. Alternatively, an investor 110 can specify allocation factors for only certain one(s) of the securities, groups, and/or sub-groups of an account. Moreover, when transmitting an order, the investor 110 can specify a total amount (or percentage of a total amount) to be used for purchasing an interest or interests in only specific securities, in specific groups, and/or in specific sub-groups, in which case the investment vehicle 120 will automatically purchase or otherwise obtain interests only in those specific securities or the securities included in the groups/sub-groups in accordance with the allocation factors associated with the specific securities, groups, and/or sub-groups. For example, given the allocation factors specified in FIG. 7C, an investor 110 can transmit an order specifying that a total of $1,000 is to be used for purchasing interests only in stocks included in the Mid Cap sub-group of the account 140f, in which case the investment vehicle 120 will automatically use the following amounts to purchase or otherwise obtain interests only in stocks Q-S:

TABLE 4

| STOCK | AMOUNT |
|---|---|
| Q | $100.00 |
| R | $100.00 |
| S | $800.00 |

Similarly, this level of customization can be extended to cover more than just one group, sub-group, or security and can be modified in any way to accommodate the desires of the investor 110. For instance, again given the original allocation factors specified in FIG. 7C, the investor 110 can transmit an order specifying that a total of $1,000 is to be used for purchasing additional interests only in AT&T stock, Sony stock, and stocks included in the Small Cap sub-group of the account 140f. The order would preferably also specify what portions (by, for example, percentage or actual dollar amount) of the $1,000 are to be used to purchase interests in AT&T stock, Sony stock, and the stocks in the Small Cap sub-group. Alternatively, if the portions are not specified in the transmitted order, the investment vehicle 120 may prompt the investor 110 as to what portions of the $1,000 are to be used to purchase interests in AT&T stock, the Sony stock, and the stocks in the Small Cap sub-group. Supposing the investor 110 chooses, for example, that 10%, 40%, and 50% of the $1,000 is to be allocated to purchasing interests in AT&T stock, Sony stock, and the stocks in the Small Cap sub-group, respectively, the investment vehicle 120 will automatically use the following amounts to purchase or otherwise obtain interests in AT&T stock, Sony stock, and stocks M-P:

TABLE 5

| STOCK | AMOUNT |
|---|---|
| AT&T | $100.00 |
| Sony | $400.00 |
| M | $125.00 |
| N | $125.00 |
| O | $125.00 |
| P | $125.00 |

Preferably, the groupings, sub-groupings, and allocation factors thus described can be specified by the investor 110 at the time the investor's account is initially opened or at any time thereafter. Furthermore, the investor 110 can preferably modify the groupings, sub-groupings, and allocation factors at any time.

It should be appreciated that the foregoing account structures will greatly facilitate the development and maintenance of an investor's account by allowing the investor 110 to logically organize the investor's portfolio of securities. In order to further facilitate the development and maintenance of the account, the investor 110 may also be provided with a visual representation of the account showing the hierarchical nature of the account structure. One such visual representation is shown in FIG. 8.

Figure 8:
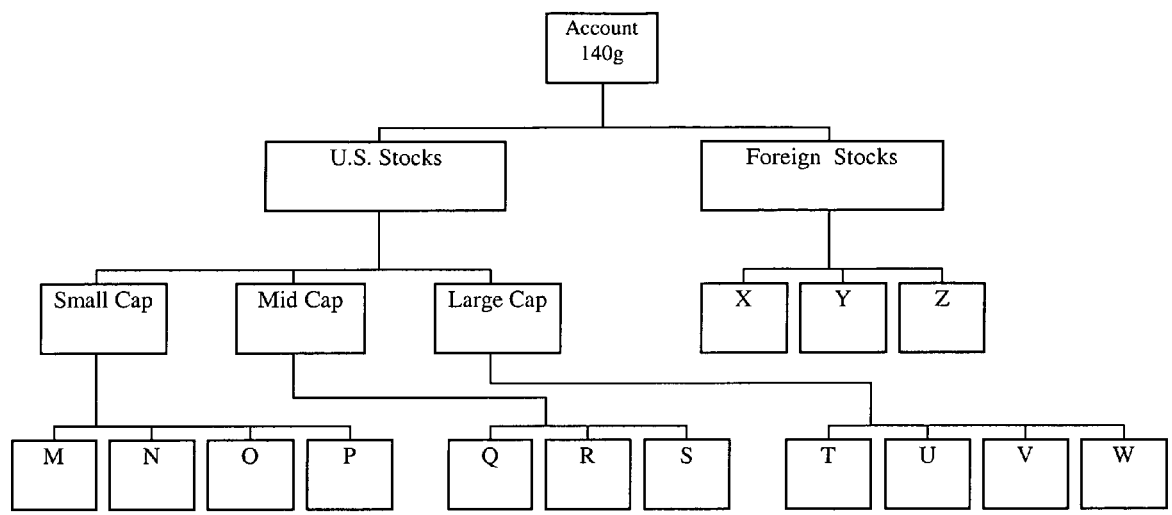
FIG. 8 is a visual representation of an account of the investment vehicle of FIG. 1 showing a hierarchical nature of the account structure.

As shown in FIG. 8, account 140g includes the groups designated "US Stocks" and "Foreign Stocks." The US Stocks group is multi-tiered and includes Small Cap, Mid Cap, and Large Cap sub-groups. The Small Cap sub-group includes stocks M-P, the Mid Cap sub-group includes stocks Q-S, and the Large Cap sub-group includes stocks T-W. The Foreign Stocks group is single-tiered and includes stocks X-Z. By providing the investor 110 with such a visual representation of account 140g, the investor 110 can easily understand the relationships between all of the stocks included in the account 140g. This will prove extremely helpful to the investor 110 when initially setting up the account 140g, when purchasing/selling interests in those stocks already included in the account 140g, and when adding new stocks, groups, and sub-groups to the account 140g.

Preferably, the investor 110 can dynamically interact with the visual representation my means of a graphical user interface (GUI). By using such a GUI, the investor 110 can easily build, reconfigure, and manage the investor's account(s) in a visually intuitive manner. In this regard, the GUI can provide the investor 110 with dynamically re-configurable building blocks that, among other things: (1) can be used by the investor 110 to build an investment portfolio structure of groups, sub-groups, and securities; (2) visually assist the investor with assigning allocation factors and achieving a desired asset allocation; (3) visually assist the investor in making portfolio changes; (4) visually assist the investor in making investments or sales; and (5) visually offer various types of portfolio information (including present stock prices, news items, and portfolio holdings, etc.). This is in sharp contrast with other investment vehicles, such as traditional brokerage accounts or mutual funds, which do not, and in many cases cannot, offer investors a dynamically re-configurable investment GUI with the same features and flexibility offered by the GUI of the present invention.

Account Asset Allocation Monitoring and Balancing

In still another embodiment of the present invention, an investor 110 can specify, for any or all holdings (portfolio holdings 142 and/or cash holdings 144) in an account, including for one or more securities, one or more groups of securities, and/or one or more subgroups of securities included in an account, percentages of the total value of the account to which the values of those holdings should correspond. For example, referring to the example account structure of FIG. 7A, the investor 110 can specify that 20% of the total value of the account 140d should be made up of stocks in the Pharmaceutical Sector group, that 70% of the total value of the account 140d should be made up of stocks in the Electronics Sector group, and that 10% of the total value of the account 140d should be made up of stocks in the Automotive Sector group. The investor 110 can also specify that 30% of the total value of the Pharmaceutical Sector group should be made up of stock A, that 20% of the total value of the Pharmaceutical Sector group should be made up of stock B, and that 50% of the total value of the Pharmaceutical Sector group should be made up of stock C. The investor 110 can similarly specify percentages for stocks D-I in view of the total value of the Electronics Sector group and Automotive Sector group.

Once the investor 110 has specified these percentages, the investment vehicle 120 can review the investor's account and compare the actual holdings in the account with the specified percentages. Upon finding a discrepancy between the actual holdings and the specified percentages, the investment vehicle 120 can notify the investor 110 of the discrepancy so that the investor 110 can take action to remedy (or at least reduce) the discrepancy if the investor 110 so desires. In addition to notifying the investor 110 of the discrepancy, the investment vehicle 120 can also suggest to the investor 110 a modification or modifications to the investor's account that would result in the account matching (or at least more closely matching) the specified percentages. Alternatively, instead of the investor 110 making modifications to the account, the investment vehicle 120 can automatically make modifications to the account in order to remedy or reduce the discrepancy. Preferably, the investment vehicle 120 makes these automatic adjustments in accordance with guidelines specified by the investor 110. For example, the investor 110 can specify that the investment vehicle 120 can automatically adjust the account only by selling and/or purchasing interests in specific securities and by only selling and/or purchasing certain amounts of those interests. Likewise, the investor 110 can specify the order in which those interests can be sold and/or purchased, e.g., specify that interests in a certain security should be sold or purchased before selling or purchasing interests in other securities.

Preferably, each time the investor 110 transmits an order to the investment vehicle 120 and before the order is acted upon, the investment vehicle 120 makes such a review and comparison in view of the transmitted order. In this way, the investment vehicle 120 can notify the investor 110 of the effect (if any) that the order may have on the account vis-à-vis the specified percentages in sufficient time for the investor 110 to modify the order and/or the investor's account such that, once the order is acted upon, the account will match (or at least more closely match) the specified percentages. Again, in addition to notifying the investor 110 of the effect that the order may have on the account, the investment vehicle 120 can also suggest to the investor 110 a modification or modifications to the order and/or the investor's account that would result in the account matching (or at least more closely matching) the specified percentages.

The investor 110 can preferably set a level of discrepancy between the investor's account and the specified percentages below which the investment vehicle 120 will not notify the investor 110 of the discrepancy and, instead, go ahead and act upon the transmitted order. For example, the investor 110 can instruct the investment vehicle 120 to notify the investor 110 only if the investor's account deviates more than 10% from the specified percentages. In this way, the investor 110 can avoid being notified by the investment vehicle 120 in cases where the investor 110 considers the discrepancy to be minor and not worthy of notification.

It should be appreciated that the investment vehicle 120 can perform the aforementioned review and comparison either on its own (e.g., as determined by the administrator of the investment vehicle 120) or upon the request of the investor 110 (this request can be a specific isolated request and/or a standing request to perform the review and comparison according to a schedule). Further, it should be appreciated that this a notification feature is especially useful in the case where the investment vehicle 120 and investors 110 form an Internet-based client-server system, whereby the investment vehicle 120 can contact the investor 110 via email or via a web-browser during an on-line communication.

To facilitate the purchasing of interests in securities for an account for which the investor 110 has specified the aforementioned percentages, the investor 110 can simply transmit to the investment vehicle 120 an order that specifies a total dollar amount to be used to purchase those interests, without having to specify how much of that total dollar amount should be used to purchase interests in which securities. Upon receiving this order, the investment vehicle 120 determines, for each security in the account, how much of the total dollar amount should be used to purchase interests in the security based on the specified percentages. The investment vehicle 120 then takes appropriate action without requiring additional action by the investor 110. Alternatively, before taking any action, the investment vehicle 120 informs the investor 110 of the action that the investment vehicle 120 intends on making and gives the investor 110 the opportunity to either modify, accept, or reject the action.

Limit Requests

In yet another embodiment of the present invention, an order transmitted by the investor 110 can include one or more limit requests. As used herein, a limit request is a request to buy or sell interests in a security or a plurality of securities only upon the happening of a specific event or condition. The event or condition can relate, for example, to one or more of the securities involved in the order, the account as a whole, the investor 110, or something or someone unrelated to the order, the account, or the investor 110. For example, a limit request can require that interests in a security be sold only if the price of the security is at or above a certain price. Likewise, a limit request can require that interests in a security be bought only if the price of the security is at or below a certain price. According to the present invention, the limit request can also be based upon a market index, such as the S&P 500 or the Dow Jones Industrial Average. For example, the limit request can require that interests in a security (or several securities) be purchased only when the Dow Industrial Average falls below a certain value. Or, the limit request can require that interests in a security (or several securities) be sold upon a certain change in the total value or weighted average value of the investor's portfolio.

Separate limit requests could be placed on any or all of the securities included in an order for any defined length of time and they can be executed independently of each other and still be considered part of the one order. Timeframes could be placed on the execution of requests for the overall order so that after a given period of time elapses, any limit requests that have not been executed are then combined with the remaining requests (if any) in the order and then executed. After the order is transmitted and during that given period of time, if any the conditions of any limit request are met, then purchase/sales triggers could be placed with respect that limit request. These triggers could be based on various criteria such as the price staying below/above the limit price set by the investor 110 or any other criteria imposed by the investor 110 and/or the administrator of investment vehicle 120. If the purchase/sale is triggered, then it will occur during the next purchase/sale execution point for the investment vehicle 120.

It should be appreciated that an order could be front-loaded so that any request in the order that is not a limit request is executed first and then any limit requests in the order remain pending for a specified period of time (or until the conditions of the limit requests are met). Alternatively, an order could be back-loaded where, during a specified period of time, all limit requests in the order can be executed independently, and at the end of the specified period of time, all requests that are not limit requests are executed. At the end of the specified period of time, the investment vehicle 120 could automatically, or at the request of the investor 110 or the administrator of the investment vehicle 120, (1) convert unfulfilled limit requests to non-limit requests for execution with the original non-limit requests, (2) allow unfulfilled limit requests to remain pending for another specified period of time, or (3) cancel the unfulfilled limit requests. The investment vehicle 120 of the present invention has the ability to support any and all variations of the foregoing situations. This type of limit request system provides additional investment flexibility for the individual investor while building an investment portfolio.

For instance, suppose an investor 110 chooses to invest $100 in the stock of each of four companies A-D (for a total of $400) on a monthly basis, and schedules this investment to take place on the last day of each month (this could also occur with a single nonrecurring investment activity). Also suppose that the investor 110 wishes to place the order and the money in the investor's account on the first day of each month and allow a one-month period for the purchases to occur. Now supposed that the investor 110 happens to have all the limit request options described above and chooses the back loaded option with automatic limit request conversion and execution, and that the investor wishes to place independent limit orders only on stocks of companies A and D in an attempt to purchase them at a price below or at least somewhat near to a certain threshold price set by the investor 110. Then two weeks into the month, the stock of company A reaches the limit price and triggers the investment vehicle 120 to execute a purchase of $100 of company A's stock for the investor 110. Stocks B and C are scheduled for purchase on the last day in the back loaded system regardless of price. However, on the last day of the month, if the stock of company D has not executed under the limit request imposed, then the limit request in respect of the stock of company D will be converted to a non-limit request and the stock of company D will be purchased along with the stocks of companies B and C at their currently executable prices.

CONCLUSION

As evidenced by the foregoing description, the present invention offers a simple yet powerful investment system and method that enable investors to buy, sell, and hold interests in securities in a manner previously unavailable. It will be apparent to those skilled in the art that various modifications and variations can be made in the investment system and method of the present invention without departing from the spirit or scope of the invention. Thus, it is intended that the present invention covers the modifications and variations of this invention provided they come within the scope of the appended claims and their equivalents.

We claim:

1. An investment system including computer hardware and computer software for enabling a plurality of investors to selectively buy and sell interests in each of a plurality of different individual securities traded on at least one financial market comprising:

a programmed computerized data processing system having at least one central processing unit for performing data processing operations, storage devices, databases, and communications interfaces;

a plurality of accounts, stored and processed by the programmed computerized data processing system, for which the plurality of investors buy and sell the interests in the plurality of securities, each of the accounts corresponding to at least one of the plurality of investors; and a graphical user interface for the plurality of investors to create and manage their at least one corresponding account, the programmed computerized data processing system performs data processing operations such that, for each of the plurality of individual securities, interests in the security which are bought or sold by the at least one investor correspond to a fractionalized market unit of the security, and the programmed computerized data processing system performing data processing operations for:

(a) accepting and executing individual orders from investors containing instruction to buy, to sell, or to both buy and sell the interests in a plurality of different individual securities;

(b) accepting individual orders containing a plurality of limit requests, monitoring each conditional event specified by the investor for each said limit request, and independently triggering the purchase or sale of securities, as instructed by the investor with each said limit request, after the conditional event specified by the investor for each said limit request has been met, or if the conditions are not met by a specified period of time, either cancelling any unfulfilled limit requests, converting unfulfilled limit requests to non-limit requests and executing them on behalf of the investor, or allowing any unfulfilled limit requests to remain pending for an additional specified period of time; and (c) accepting individual orders containing at least one limit request applied to a plurality of different individual securities, monitoring the conditional event specified by the investor for each said limit request and triggering the purchase or sale of the plurality of securities, as instructed by the investor in the limit request, after the conditional event specified by the investor in the limit request has been met, or if the conditions are not met by a specified period of time, either cancelling any unfulfilled limit requests, converting unfulfilled limit requests to non-limit requests and executing them on behalf of the investor, or allowing any unfulfilled limit requests to remain pending for an additional specified period of time.

2. The investment system of claim 1, wherein the computerized data processing system accepts, monitors, and executes limit requests associated with a plurality of different individual securities, wherein the plurality of securities represents a partial set of the investor's whole portfolio of securities.

3. The investment system of claim 1, wherein the computerized data processing system accepts and monitors conditional events relating to at least one of a market index, a change in a portfolio total value, a change in a portfolio weighted average value, a corresponding one of the plurality of accounts as a whole, and a corresponding one of the investors.

4. The investment system of claim 1, wherein the computerized data processing system accents and monitors conditional events relating to something or someone unrelated to corresponding ones of the securities, a corresponding one of the accounts, or a corresponding one of the investors.

5. The investment system of claim 1, wherein the computerized data processing system performs operations for accepting and processing investor instructions to organize, using the graphical user interface, holdings in the corresponding accounts into one or more groups defined by the investors to suit the investors' portfolio structuring desires.

6. The investment system of claim 5, wherein the computerized data processing system performs operations for accepting and processing investor instructions to specify an allocation factor for each security and for each group included in the account, the allocation factor for a group specifying a percentage of a total amount to be used to purchase interests in securities for the account, and the allocation factor for a security specifying a percentage of a total amount to be to be used to purchase interests in securities for the group in which the security is located, or if the security is not in a group, a percentage of the total amount to be used to purchase interests in securities for the account.

7. The investment system vehicle of claim 5, wherein the graphical user interface provides the investors with dynamically re-configurable building blocks for visually intuitive account management, each building block representing at least one of a security and a group of securities held in a corresponding one of the accounts.

8. The investment system of claim 5, the computerized data processing system performing operations supporting investor instructions specifying for securities and groups of securities in a corresponding one of the accounts percentages of the total value of the account to which the values of the holdings should correspond, and wherein the computerized data processing system reviews the investor's account and compares the holdings in the account with the specified percentages, and upon finding a discrepancy between the holdings and the specified percentages, which discrepancy is above a level set by the investor notifies the investor of the discrepancy.

9. The investment system vehicle of claim 1, wherein the computerized data processing system performs operations for accepting and processing investor instructions to organize, using the graphical user interface, holdings in the corresponding accounts into hierarchical, multi-tiered portfolio structures of one or more groups and subgroups that are defined by the investors to suit the investors' portfolio structuring desires.

10. The investment system of claim 9, wherein the computerized data processing system performs operations for accenting and processing investor instructions to specify an allocation factor for each security, for each group and for each sub-group included in their corresponding account, the allocation factor for a group specifying a percentage of a total amount to be used to purchase interests in securities for the account in which the group is located, the allocation factor for a sub-group specifying a percentage of a total amount to be used to purchase interests in securities for the group in which the sub-group is located, and the allocation factor for a security specifying a percentage of a total amount to be to be used to purchase interests in securities for the group or sub-group in which the security is located, or if the security is not in a group or sub-group, a percentage of the total amount to be used to purchase interests in securities for the account in which the security is located.

11. The investment system of claim 9, wherein the computerized data processing system performs operations supporting investor account portfolio structures where subgroups themselves have subgroups.

12. The investment system of claim 9, wherein the computerized data processing system performs operations supporting account portfolio structures where individual securities reside at any tier level alongside groups and subgroups within the account portfolio.

13. The investment system of claim 9, wherein the graphical user interface provides the investors with dynamically re-configurable building blocks for visually intuitive account management, each building block representing at least one of a security, a group of securities, and a subgroup of securities held in a corresponding one of the accounts.

14. The investment system of claim 9, the computerized data processing system performing operations supporting investor instructions specifying for securities, groups of securities, and subgroups of securities in a corresponding one of the accounts percentages of the total value of the account to which the values of the holdings should correspond, and wherein the computerized data processing system reviews the investor's account and compares the holdings in the account with the specified percentages, and upon finding a discrepancy between the holdings and the specified percentages, which discrepancy is above a level set by the investor, notifies the investor of the discrepancy.

15. The investment system of claim 1, the computerized data processing system performing operations supporting investor instructions specifying for holdings in a corresponding one of the accounts percentages of the total value of the account to which the values of the holdings should correspond, and wherein the computerized data processing system reviews the investor's account and compares the holdings in the account with the specified percentages, and upon finding a discrepancy between the holdings and the specified percentages, which discrepancy is above a level set by the investor, notifies the investor of the discrepancy.

16. The investment system of claim 1, wherein the computerized data processing system performs operations supporting and executing a systematic investment program for at least one investor account, wherein a systematic investment program is the practice of investing equal amounts of money in a specified set of securities at regularly scheduled intervals through recurring orders.

17. The investment system of claim 16, wherein the computerized data processing system performs operations compatibly managing the systematic investment program with the limit request operations.

18. The investment system of claim 17, wherein the computerized data processing system performs operations managing the systematic investment program for the investor's specified set of securities by monitoring and allowing the limit requests associated with the systematic investment program to remain pending until the conditions of the limit request are met.

19. The investment system of claim 17, wherein the computerized data processing system performs operations managing the systematic investment program for the investor's specified set of securities by monitoring and allowing the limit requests associated with the systematic investment program to remain pending for any defined length of time, whereby at the end of the defined length of time any unfulfilled limit requests are either canceled, converted to a non-limit request and executed on behalf of the investor, or allowed to remain pending for an additional specified period of time.

20. An investment system including computer hardware and computer software for enabling a plurality of investors to selectively buy and sell interests in each of a plurality of different individual securities traded on at least one financial market, comprising:

a programmed computerized data processing system having at least one central processing unit for performing data processing operations, storage devices, databases, and communications interfaces;

a plurality of accounts, stored and processed by the programmed computerized data processing system, for which the plurality of investors buy and sell the interests in the plurality of securities, each of the accounts corresponding to at least one of the plurality of investors; and a graphical user interface for the plurality of investors to create and manage their at least one corresponding account, the programmed computerized data processing system performs data processing operations such that, for each of the plurality of individual securities, interests in the security which are bought or sold by the at least one investor correspond to a fractionalized market unit of the security, and the programmed computerized data processing system performing data processing operations for:

(a) accepting and executing individual orders from investors containing instruction to buy, to sell, or to both buy and sell the interests in a plurality of different individual securities;

(b) accepting individual orders containing at least one limit request, monitoring each conditional event specified by the investor for each said limit request, and independently triggering the purchase or sale of securities, as instructed by the investor with each said limit request, after the conditional event specified by the investor for each said limit request has been met, or if the conditions are not met by a specified period of time, either cancelling any unfulfilled limit requests, converting unfulfilled limit requests to non-limit requests and executing them on behalf of the investor, or allowing any unfulfilled limit requests to remain pending for an additional specified period of time;

(c) accepting individual orders containing at least one limit request applied to a plurality of different individual securities, monitoring the conditional event specified by the investor for each said limit request and triggering the purchase or sale of the plurality of securities, as instructed by the investor in the limit request, after the conditional event specified by the investor in the limit request has been met, or if the conditions are not met by a specified period of time, either cancelling any unfulfilled limit requests, converting unfulfilled limit requests to non-limit requests and executing them on behalf of the investor, or allowing any unfulfilled limit requests to remain pending for an additional specified period of time; and (d) supporting and executing a systematic investment program for at least one investor account and compatibly managing the systematic investment program with the limit request operations, wherein a systematic investment program is the practice of investing equal amounts of money in a specified set of securities at regularly scheduled intervals through recurring orders.

* * * * *